United States Patent
Suigetsu (10) Patent No.: US 8,632,646 B2
(45) Date of Patent: Jan. 21, 2014

(54) METHOD FOR JOINING PIPES AND JUNCTION STRUCTURE FOR JOINING PIPES

(75) Inventor: Naoki Suigetsu, Tokyo (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 13/476,502

(22) Filed: May 21, 2012

(65) Prior Publication Data

US 2012/0291940 A1 Nov. 22, 2012

Related U.S. Application Data

(62) Division of application No. 12/721,938, filed on Mar. 11, 2010, now abandoned.

(30) Foreign Application Priority Data

Mar. 11, 2009 (JP) ................................. 2009-058023

(51) Int. Cl.
*B32B 37/00* (2006.01)

(52) U.S. Cl.
USPC ...................................... 156/73.1; 156/308.4

(58) Field of Classification Search
USPC ............ 156/73.1, 304.1, 304.2, 308.2, 308.4, 156/580.1, 580.2; 264/442, 443, 444, 445
See application file for complete search history.

(56) References Cited

U.S. PATENT DOCUMENTS

| | | | |
|---|---|---|---|
| 3,499,808 A * | 3/1970 | Obeda | 264/249 |
| 4,326,903 A * | 4/1982 | Summo | 156/73.1 |
| 4,859,378 A | 8/1989 | Wolcott | |
| 4,998,337 A | 3/1991 | Tiekink | |
| 5,333,650 A | 8/1994 | Folkman | |
| 5,380,048 A | 1/1995 | Vogel | |

(Continued)

FOREIGN PATENT DOCUMENTS

| | | |
|---|---|---|
| JP | 5-271626 | 10/1993 |
| JP | 2000-503749 | 3/2000 |
| JP | 2000-326414 A | 11/2000 |
| WO | WO 97/25566 | 7/1997 |

OTHER PUBLICATIONS

U.S. Office Action dated Feb. 22, 2012, received in related U.S. Appl. No. 12/721,938.

(Continued)

*Primary Examiner* — James Sells
(74) *Attorney, Agent, or Firm* — Scully, Scott, Murphy & Presser, P.C.

(57) ABSTRACT

A method for joining pipes in which a first pipe in which at least one portion to be engaged is sunk inward to an inner circumferential surface side provided in an outer circumferential surface of an end portion of the first pipe, and a second pipe made of thermoplastic resin are joined together. The method includes: inserting an end portion of the first pipe into an end portion of the second pipe; and as a result of a component that transmits ultrasonic waves against an outer circumferential surface of the second pipe that corresponds to the portion to be engaged of the inserted first pipe, softening the second pipe by the ultrasonic waves so that an engaging portion is formed which is made to protrude into the portion to be engaged and is positioned on the inner circumferential surface of the first pipe.

2 Claims, 10 Drawing Sheets

(56) References Cited

U.S. PATENT DOCUMENTS 5,404,630 A    4/1995   Wu
5,466,916 A   11/1995   Iguchi et al.
6,070,915 A    6/2000   Luo
6,761,187 B1   7/2004   Zoellner
6,926,187 B2   8/2005   Kurita et al.

OTHER PUBLICATIONS

Notice of Reasons for Rejection dated Mar. 19, 2013 from corresponding Japanese Patent Application No. 2009-058023, together with an English language translation.

* cited by examiner

METHOD FOR JOINING PIPES AND JUNCTION STRUCTURE FOR JOINING PIPES

CROSS REFERENCE TO RELATED APPLICATION

This Application is a divisional of U.S. patent application Ser. No. 12/721,938, filed Mar. 11, 2010, now abandoned, the entire content and disclosure of which is incorporated herein by reference.

BACKGROUND OF THE INVENTION

1. Field of the Invention

The present invention relates to a pipe joining method for joining pipes together, and to a junction structure for joining pipes. In particular, the present invention relates to a method for joining pipes and a junction structure for joining pipes when one of the pipes is formed from a thermoplastic resin.

Priority is claimed on Japanese Patent Application No. 2009-58023, filed Mar. 11, 2009, the contents of which are incorporated herein by reference.

2. Description of Related Art

Conventionally, various methods and structures have been proposed for joining pipes together. Specifically, these relate to methods for joining together a first pipe that is made of metal and a second pipe that is made of thermoplastic resin. For example, a method has been proposed in which an outer circumferential surface of a first pipe is coated with an adhesive agent which is made of the same type of resin as the resin used to form a second pipe. The first pipe is then inserted into the second pipe, and the two are heated and then cooled (see, for example, Japanese Unexamined Patent Application, Publication No. H5-271626). According to this method, the junction between the first pipe and the second pipe can be made strong and airtight.

Another structure has been proposed in which a toroidal projection is provided on an outer circumference of one pipe, and a toroidal depression is provided in an inner circumferential surface of the other pipe. When the one pipe is inserted into the other pipe, the projection engages with the depression (see, for example, Published Japanese Translation No. 2000-503749 of the PCT International Publication). According to this type of structure a join is easily achieved as, simply by inserting one pipe into the other pipe, the projection is engaged with the depression and the two pipes are joined together.

SUMMARY OF THE INVENTION

The present invention employs the following means.

The present invention is a method for joining pipes in which a first pipe in which at least one portion to be engaged that is sunk inward to an inner circumferential surface side is provided in an outer circumferential surface of an end portion of the first pipe, and a second pipe that is made of thermoplastic resin are joined together. Furthermore, the present invention is provide with a first step in which an end portion of the first pipe is inserted into an end portion of the second pipe, and a second step in which, as a result of a transmitting component that transmits ultrasonic waves being pressed against a position on an outer circumferential surface side of the second pipe that corresponds to the portion to be engaged of the inserted first pipe, the second pipe is softened by the ultrasonic waves so that an engaging portion is formed which is made to protrude into the portion to be engaged, which is positioned on the inner circumferential surface side of the first pipe, and becomes engaged with this portion to be engaged.

According to the method for joining pipes of the present invention, in a first step, an end portion of a first pipe is inserted into an end portion of a second pipe. In a second step, a transmitting component that transmits ultrasonic waves is pressed against a position on an outer circumferential surface side of the second pipe that corresponds to the portion to be engaged that is formed on an end portion of the inserted first pipe. Ultrasonic waves emitted from this transmitting component are transmitted to a main body portion of the second pipe via the outer circumferential surface thereof. As a result of this, frictional heat is generated in the second pipe. The second pipe which is made of a thermoplastic resin is heated and softened by this frictional heat. In addition, the portion thereof which is pressed by the transmitting component forms an engaging portion which protrudes inside the portion to be engaged of the first pipe which is positioned on the inner circumferential surface side of the second pipe. After cooling and hardening, the engaging portion forms a state of engagement with the engaged portion. Because of this, the first pipe and the second pipe can be securely joined together by the engaged portion and the engaging portion. As described above, in the method for joining pipes of the present invention, when the first pipe has been inserted inside the second pipe, it is only necessary to press the second pipe while ultrasonic waves are being transmitted thereto by the transmitting component. Because of this, it is possible to easily and securely join the two together while maintaining a state (i.e., a superior state) in which surface irregularities created on the outer circumferential surface of the second pipe are kept to a minimum.

In the above described method for joining pipes, it is preferable for the second pipe to be provided with at least one protruding portion on an outer circumferential surface of an end portion thereof that corresponds to the portion to be engaged of the first pipe, and, in the second step, for the engaging portion to be formed by this protruding portion being pressed by the transmitting component.

According to the method for joining pipes of the present invention, in the second step, a transmitting component is pressed against a protruding portion formed on an outer circumferential surface of the second pipe, and transmits ultrasonic waves. The second pipe is heated and softened by the frictional heat generated by the ultrasonic waves and is also pressed. As a result, an engaging portion that protrudes on the inner circumferential surface side of the second pipe is formed. At this time, the protruding portion on the outer circumferential surface side of the second pipe sinks inside the outer circumferential surface of the second pipe as the engaging portion which protrudes on the inner circumferential surface side is gradually being formed. If the transmitting component is pressed until it contacts the outer circumferential surface surrounding the protruding portion of the second pipe, it is possible to keep the outer circumferential surface of the second pipe in a state with few surface irregularities (i.e., in a superior state) while maintaining a state in which the first pipe and the second pipe are securely joined together.

In the above described method for joining pipes, it is preferable for the portion to be engaged of the first pipe to be a through hole that penetrates from the outer circumferential surface to the inner circumferential surface of the first pipe. Furthermore, in the second step, after a molding jig has been positioned inside the first pipe within a range where at least the through hole is formed and while being positioned apart from the inner circumferential surface of the first pipe, it is preferable for the transmitting component to be pressed against the second pipe so that a portion of the second pipe is made to protrude onto the inner circumferential surface side of the first pipe as an engaging portion until the second pipe is deformed by the molding jig.

According to the method for joining pipes of this invention, in the second step, ultrasonic waves are transmitted from the transmitting component while a molding jig is positioned inside the first pipe. As a result of the second pipe being heated and softened by these ultrasonic waves, the engaging portion which protrudes onto the inner circumferential surface side of the second pipe protrudes from the portion to be engaged, which forms a through hole, onto the inner circumferential surface side of the first pipe, and contacts the molding jig. Furthermore, if the pressing is performed while the ultrasonic waves are being transmitted by the transmitting component, the engaging portion is prevented by the molding jig from protruding any further onto the inner circumferential surface side of the first pipe. Namely, the engaging portion is deformed in a sideways direction on the molding jig, and the width of the engaging portion being engaged expands to become wider than the width of the portion being engaged. Because of this, the distal end of the engaging portion of the second pipe becomes engaged with the portion being engaged, and the engagement strength can be improved even further.

The present invention is a junction structure for joining pipes together in which an end portion of a first pipe is inserted into an end portion of a second pipe that is made from a thermoplastic resin. The present invention is provided with at least one portion to be engaged that is provided on an outer circumferential surface of an end portion of the first pipe so as to be sunk inward to the inner circumferential surface side, and with an engaging portion that is provided so as to protrude from the inner circumferential surface of the end portion of the second pipe, and the portion to be engaged and the engaging portion are engaged together.

According to the junction structure for joining pipes of this invention, as a result of the engaging portion of the second pipe being engaged with the portion to be engaged which is formed on the outer circumferential surface of the first pipe within the range where the end portion of the first pipe is inserted inside the second pipe, it is possible for the two pipes to be securely joined together. Note that, in this junction structure for joining pipes, because an engaging portion that protrudes onto the inner circumferential surface side of the second pipe is formed by deforming the second pipe and made to become engaged with the portion to be engaged of the first pipe, the two pipes can be easily joined together.

In the above described junction structure for joining pipes, it is preferable for the engaging portion to be formed as a result of the second pipe being softened and deformed by ultrasonic waves.

According to the junction structure for joining pipes of this invention, by heating and softening the second pipe using ultrasonic waves and thereby deforming it, the task of joining the two pipes together is made easy. Furthermore, the outer circumferential surface of the second pipe can be formed in a state of few surface irregularities (i.e., in an even more superior state).

In the above described junction structure for joining pipes, it is preferable for the engaging portion to be a portion which is made to protrude onto the inner circumferential surface side as a result of ultrasonic waves being transmitted to the protruding portion which is protruding on the outer circumferential surface side of the second pipe.

According to the junction structure for joining pipes of this invention, when an engaging portion is being formed by being heated and softened using ultrasonic waves and by then being deformed, the protruding portion which protrudes on the outer circumferential surface side is softened. As a result of this, the outer circumferential surface of the second pipe can be formed in a state of few surface irregularities (i.e., in an even more superior state).

In the above described junction structure for joining pipes, it is preferable for the portion to be engaged to be a through hole that penetrates from the outer circumferential surface side to the inner circumferential surface side of the first pipe. Furthermore, it is also preferable for a distal end of the engaging portion to protrude onto the inner circumferential surface side of the first pipe, and for the width of the distal end to be wider than the width of the through hole.

According to the junction structure for joining pipes of this invention, the distal end of the engaging portion of the second pipe that is engaged with the portion to be engaged of the first pipe is formed so that the width thereof expands. Namely, the distal end can be engaged in the portion to be engaged, which is a through hole, so that the join strength is improved even further.

DETAILED DESCRIPTION OF THE INVENTION

First Embodiment

Figure 1:
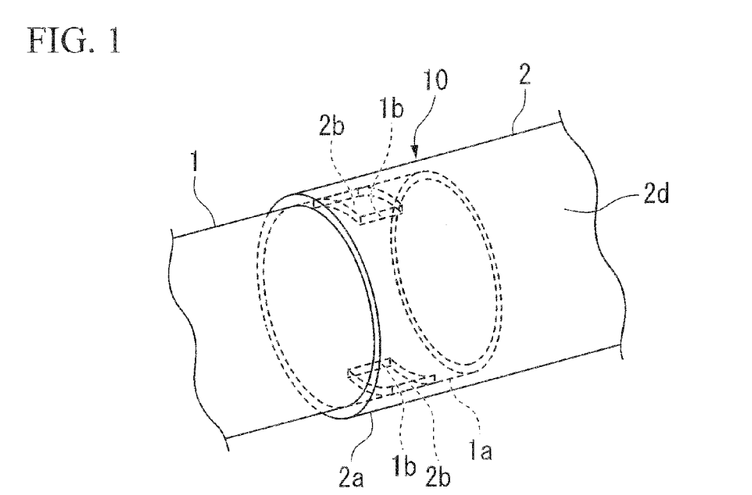
FIG. 1 is a perspective view showing a junction structure for joining pipes of a first embodiment of the present invention.
Figure 2:
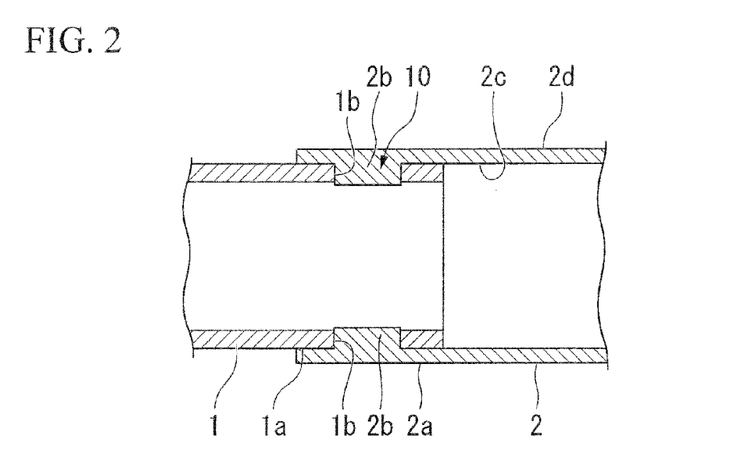
FIG. 2 is a cross-sectional view as seen from a side showing the junction structure for joining pipes of the first embodiment of the present invention.
Figure 3:
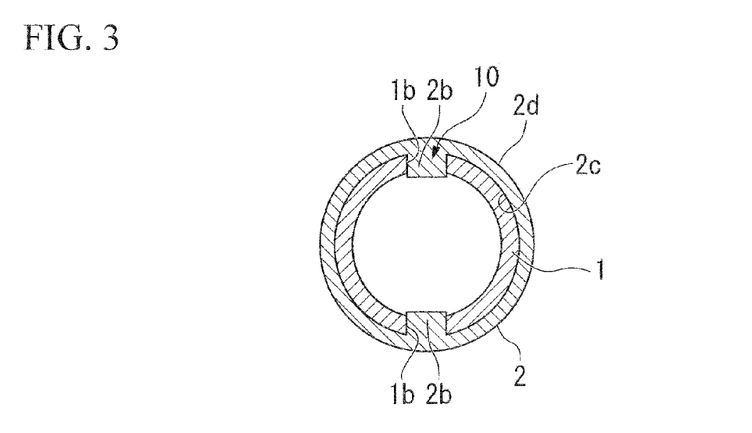
FIG. 3 is a cross-sectional view as seen from the front showing the junction structure for joining pipes of the first embodiment of the present invention.

A first embodiment of the present invention is described with reference made to FIG. 1 through FIG. 8. FIG. 1 through FIG. 3 show a first pipe and a second pipe that have been joined together using the junction structure of the present invention. As shown in FIG. 1 through FIG. 3, a junction structure 10 of the present embodiment joins together a first pipe 1 and a second pipe 2.

The first pipe 1 has a substantially circular cross-section, and through holes 1b which form portions to be engaged are provided in an end portion 1a that is inserted into the second pipe 2. In the present embodiment, two through holes 1b are provided at positions facing each other in the radial direction of the first pipe 1. Note that each through hole 1b is formed in a substantially rectangular shape.

The second pipe 2 has a substantially circular cross-section, and is provided with engaging portions 2b that protrude from an inner circumferential surface of an end portion 2a into which the first pipe 1 is inserted. These engaging portions 2b are provided at positions where they engage with the through holes 1b of the first pipe 1. Namely, two engaging portions 2b are provided at positions facing each other.

When the first pipe 1 and the second pipe 2 have been joined together, the engaging portions 2b respectively engage with the through hole 1b in the corresponding position. Namely, the through holes 1b of the first pipe 1 and the engaging portions 2b of the second pipe 2 constitute a junction structure 10 by being mutually engaged.

Note that, as described below, because the engaging portions 2b are formed by heating and softening the second pipe 2 using ultrasonic waves, the second pipe 2 is made of a thermoplastic resin such as ABS (acrylonitrile-butadiene-styrene copolymer) or polyethylene or the like. In contrast, the first pipe 1 can be selectively made of various materials such as metal, resin, ceramics or the like. However, as described below, because the second pipe 2 is joined to the first pipe 1 by being heated and softened, it is desirable for the material used for the first pipe 1 to be provided with a higher melting point and a greater hardness than the thermoplastic resin used to form the second pipe 2.

Furthermore, it is preferable for the gap between the outer circumferential surface of the first pipe 1 and the inner circumferential surface of the second pipe 2 to be as small as possible when the first pipe 1 and the second pipe 2 are engaged. For example, if both the first pipe 1 and the second pipe 2 are pipes having a diameter of approximately 10 mm, it is preferable for the outer diameter of the first pipe 1 and the inner diameter of the second pipe 2 to be set such that this gap is not more than 0.05 mm. Moreover, it is also possible for the outer diameter of the first pipe 1 to be made slightly larger than the inner diameter of the second pipe 2, and to press-insert the first pipe 1 inside the second pipe 2 such that at least one of the first pipe 1 or the second pipe 2 is elastically deformed. By employing a dimensional relationship that allows this type of press-insertion, an even stronger junction state can be achieved.

Next, a process to join together the first pipe 1 and the second pipe 2 by means of this junction structure 10 is described in detail.

Figure 4:
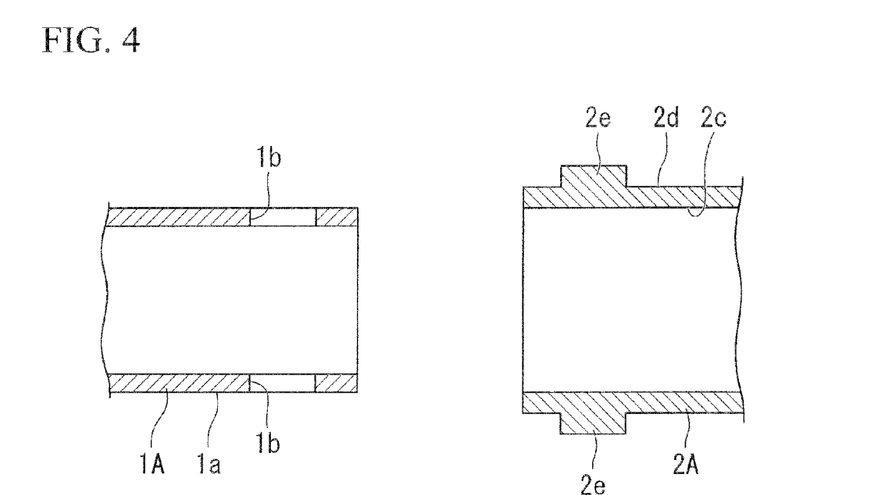
FIG. 4 is an explanatory view showing a preliminary step of a method for joining pipes of the first embodiment of the present invention.

As shown in FIG. 4, in a preliminary step, a pre-join first pipe 1A and second pipe 2A are prepared. Through holes 1b are formed in the first pipe 1A in an end portion 1a thereof which is inserted into the second pipe 2A. Protruding portions 2e that protrude from an outer circumferential surface 2d are formed on the second pipe 2A at positions that correspond to the through holes 1b of the inserted first pipe 1A. The shape of these protruding portions 2e is formed so as to correspond to the through holes 1b in the first pipe 1A. Namely, the protruding portions 2e are formed in a rectangular shape having substantially the same transverse dimensions as the through holes 1b. Moreover, the protrusion amount is set so as to be substantially the same as the protrusion amount of the engaging portions 2b (described below). In contrast, in order for the first pipe 1A to be smoothly inserted therein, the second pipe 2A does not have any portion that protrudes from the inner circumferential surface 2c thereof.

Figure 5A:
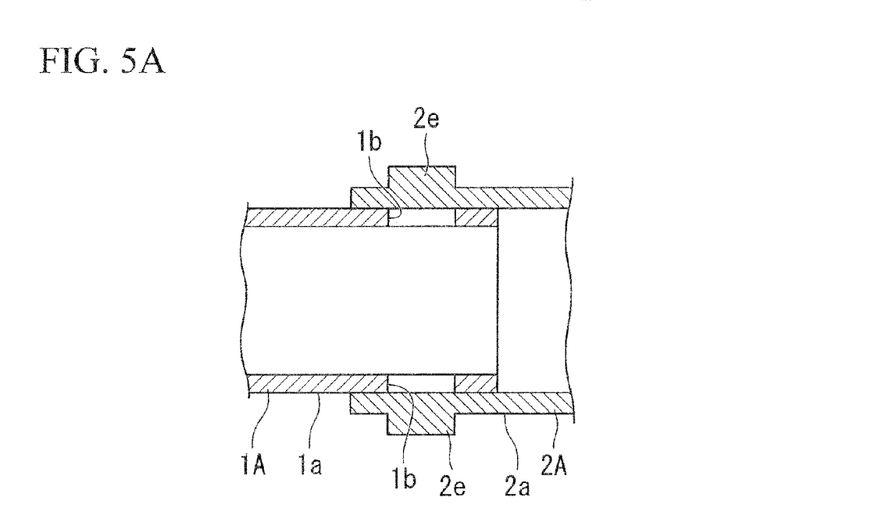
FIG. 5A is an explanatory view showing a first step of the method for joining pipes of the first embodiment of the present invention.
Figure 5B:
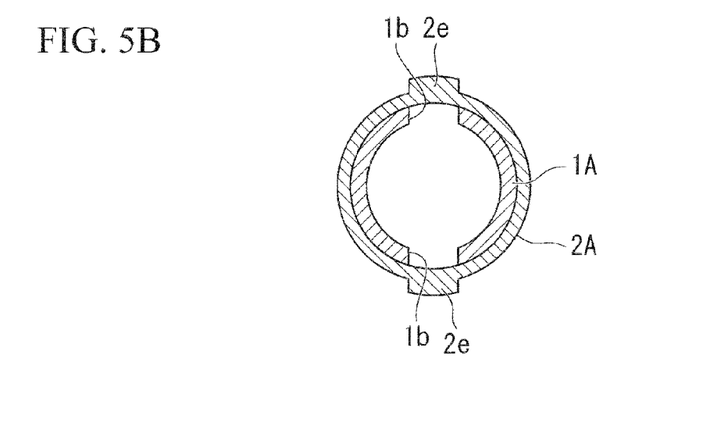
FIG. 5B is an explanatory view showing the first step of the method for joining pipes of the first embodiment of the present invention.

Next, in a first step, as shown in FIG. 5A and FIG. 5B, the first pipe 1A and the second pipe 2A are fixed in positions where they are able to be joined together. Namely, as shown in FIG. 5, the first pipe 1A and the second pipe 2A are each fixed in a fixing jig (not shown), and the end portion 1a of the first pipe 1A is inserted inside the second pipe 2A. At this time, because no protruding portion has been provided on the inner circumferential surface of the second pipe 2A, the first pipe 1A can be easily inserted into the second pipe 2A. In addition, the positions in the axial directions and circumferential directions of the first pipe 1A and second pipe 2A are adjusted such that the positions of the through holes 1b and the protruding portions 2e substantially match each other in the axial direction and circumferential direction, and the through holes 1b and the protruding portions 2e are set so as to be in the same positions in the radial directions of the first pipe 1A and the second pipe 2A.

Figure 6:
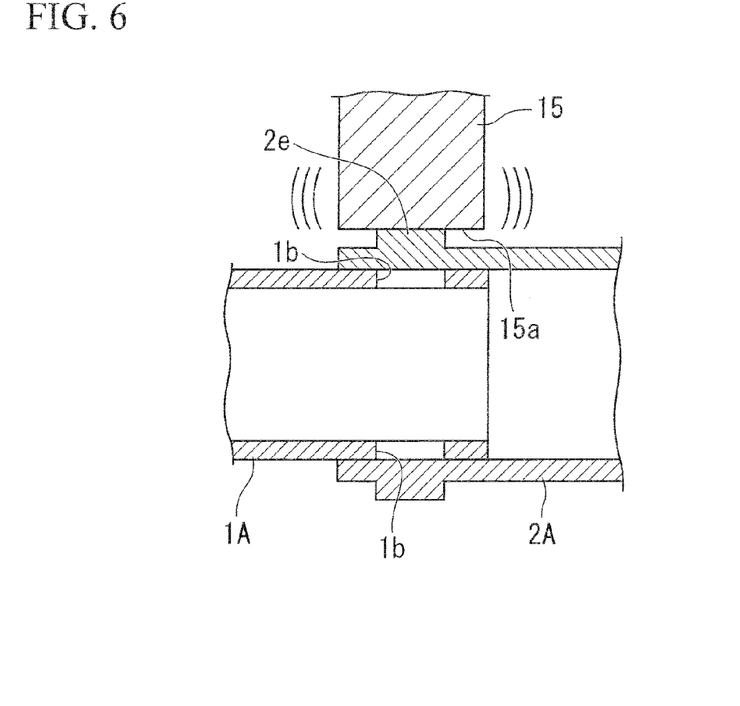
FIG. 6 is an explanatory view showing a second step of the method for joining pipes of the first embodiment of the present invention.

Next, in a second step, as shown in FIG. 6, an ultrasonic horn 15 which is a transmitting component is placed against one protruding portion 2e of the second pipe 2A, and the protruding portion 2e is pressed towards the inner circumferential surface side in the radial direction while ultrasonic waves are being generated. Here, an end surface 15a of the ultrasonic horn 15 that is placed against the protruding portion 2e preferably has a concave portion having a radius of curvature that is substantially equal to the radius of curvature of the outer circumferential surface 2d of the second pipe 2.

The ultrasonic waves emitted from the ultrasonic wave horn 15 are transmitted via the protruding portion 2e to the main body portion of the second pipe 2A. As a result, frictional heat is generated in the second pipe 2A. At this time, the second pipe 2A is made of a thermoplastic resin, and the first pipe 1A has the through holes 1b in positions facing the ultrasonic horn 15. Because of this, the second pipe 2A is heated and softened by the frictional heat generated by the transmitted ultrasonic waves. Furthermore, the protruding portion 2e is deformed into an engaging portion 2b which protrudes inside the through hole 1b on the inner circumferential surface side in the radial direction of the second pipe 2A by the pressing force from the ultrasonic horn 15. And the engaging portion 2b is thus engaged with the through hole 1b in the first pipe 1A which forms a portion to be engaged. At this time, the protruding portion 2e against which the ultrasonic horn 15 has been placed sinks into the inner circumferential side of the second pipe 2A by substantially the same volumetric amount as the volume of the engaging portion 2b which is protruding onto the inner circumferential surface side of the second pipe 2A. As a result, the outer circumferential surface 2d of the second pipe 2A and the outer circumferential surface of the protruding portion 2e are substantially the same.

Figure 7:
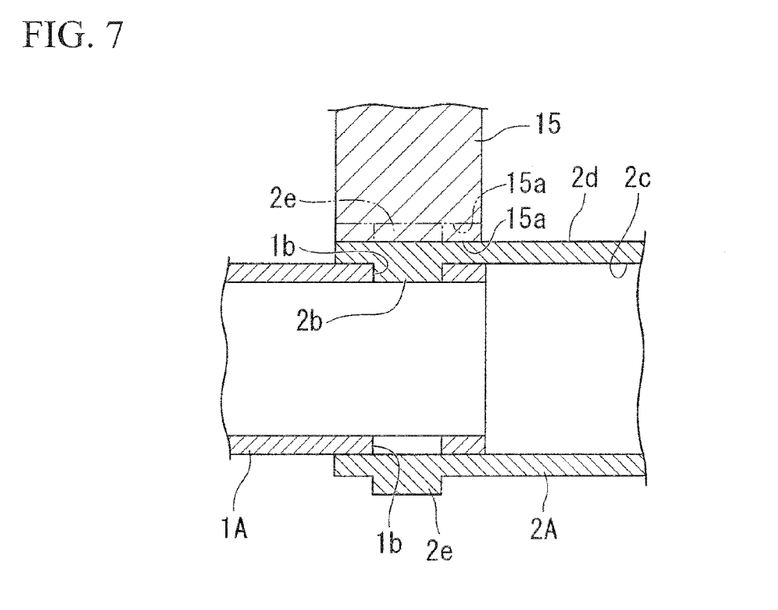
FIG. 7 is an explanatory view showing the second step of the method for joining pipes of the first embodiment of the present invention.

Next, as shown in FIG. 7, while the end surface 15a of the ultrasonic horn 15 is placed against the outer circumferential surface 2d of the second pipe 2A, the ultrasonic wave oscillation is stopped and the heat-softened resin is allowed to cool and harden.

Figure 8:
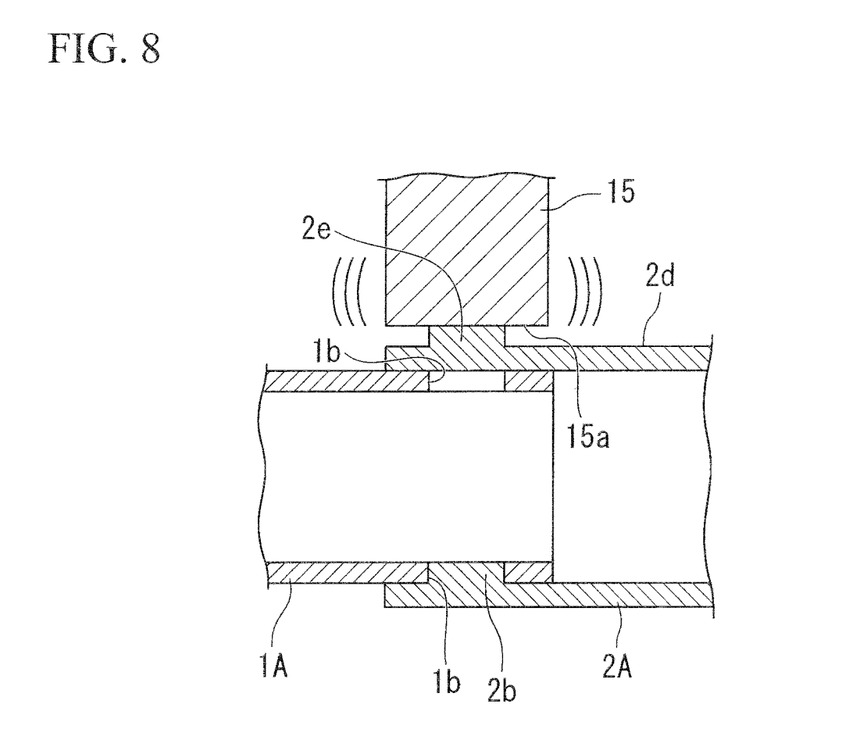
FIG. 8 is an explanatory view showing the second step of the method for joining pipes of the first embodiment of the present invention.

In the final step, as shown in FIG. 8, the first pipe 1A and the second pipe 2A are inverted, and the protruding portion 2e on the opposite side as well also forms an engaging portion 2b by being pressed while receiving transmitted ultrasonic waves in the same way from the ultrasonic horn 15. As a result, all of the engaging portions 2b protruding on the inner circumferential side of the second pipe 2 are engaged with all of the through holes 1b which are the portions to be engaged of the first pipe 1. Namely, as shown in FIG. 1 through FIG. 3, the first pipe 1 and the second pipe 2 are set in a securely joined state by means of the junction structure 10 which is provided with the through holes 1b and the engaging portions 2b.

According to the above described junction structure 10 and joining method, when the first pipe 1 is inserted inside the second pipe 2, it is only necessary to press the second pipe 2 while ultrasonic waves are being transmitted thereto by the ultrasonic horn 15. Because of this, it is possible to easily and securely join the two together while maintaining a state (i.e., a superior state) in which surface irregularities created on the outer circumferential surface 2d of the second pipe 2 are kept to a minimum.

Furthermore, when the second pipe 2 is being pressed so as to form an engaging portion 2b, the outer circumferential surface 2d is also deformed. However, according to the above described junction structure 10 and joining method, by forming the protruding portions 2e on the outer circumferential surface 2d of the second pipe 2 and then pressing the protruding portions 2e using the ultrasonic horn 15, it is possible to form engaging portions 2b on the inner circumferential surface 2c side that have the same size as the volume of the sunken protruding portions 2e. Because of this, it is possible to keep the outer circumferential surface 2d of the second pipe 2 in a superior state with few surface irregularities while securely joining together the first pipe 1 and the second pipe 2.

Even if the outer circumferential surface of the second pipe 2 is melted and softened by means of a heating iron in order to form the engaging portions, it is still possible to deform the second pipe 2 and cause the second pipe 2 to protrude on the inner circumferential surface side in the same way. However, because the portion attaining the highest temperature is the outer circumferential surface pressed by the heating iron, the problem arises that surface irregularities remain in the pressed portion after the joining. In contrast, in the joining method of the present embodiment in which the second pipe 2 is heated and softened by the applying thereto of ultrasonic waves, as described above, it is possible to keep to a minimum any surface irregularities on the outer circumferential surface 2d of the second pipe 2 after the joining. In particular, in the joining method of the present embodiment, the pressing by the ultrasonic horn 15 is made to continue till the end surface 15a contacts the outer circumferential surface 2d of the second pipe 2. Furthermore, the end surface 15a is formed as a concave surface whose radius of curvature is substantially equal to that of the outer circumferential surface 2. After the joining, the shape of the end surface 15a is transferred to the outer circumferential surface of the second pipe 2 so that the outer circumferential surface of the second pipe 2 can be made uniform. Namely, a state in which there are substantially no surface irregularities on the outer circumferential surface of the second pipe 2 can be achieved, and the external appearance of the pipe after the joining can be made even better.

Figure 9:
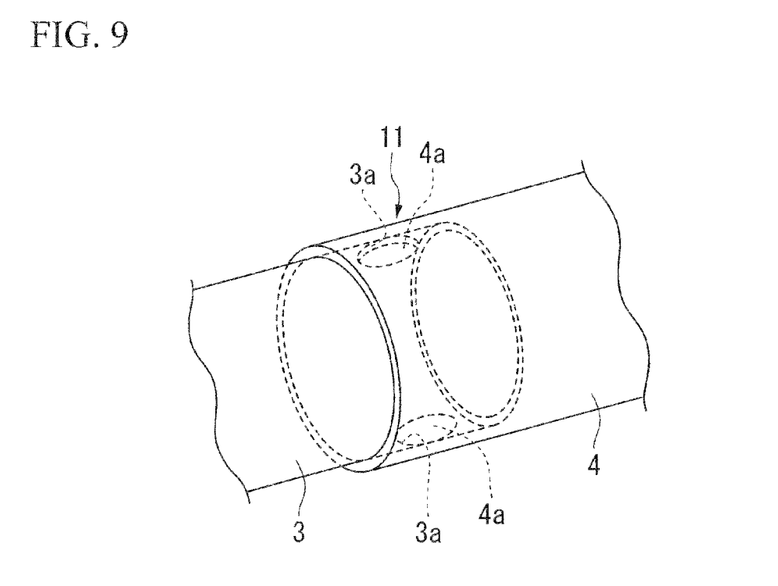
FIG. 9 is a perspective view showing the junction structure for joining pipes of a first variant example of the first embodiment of the present invention.
Figure 10:
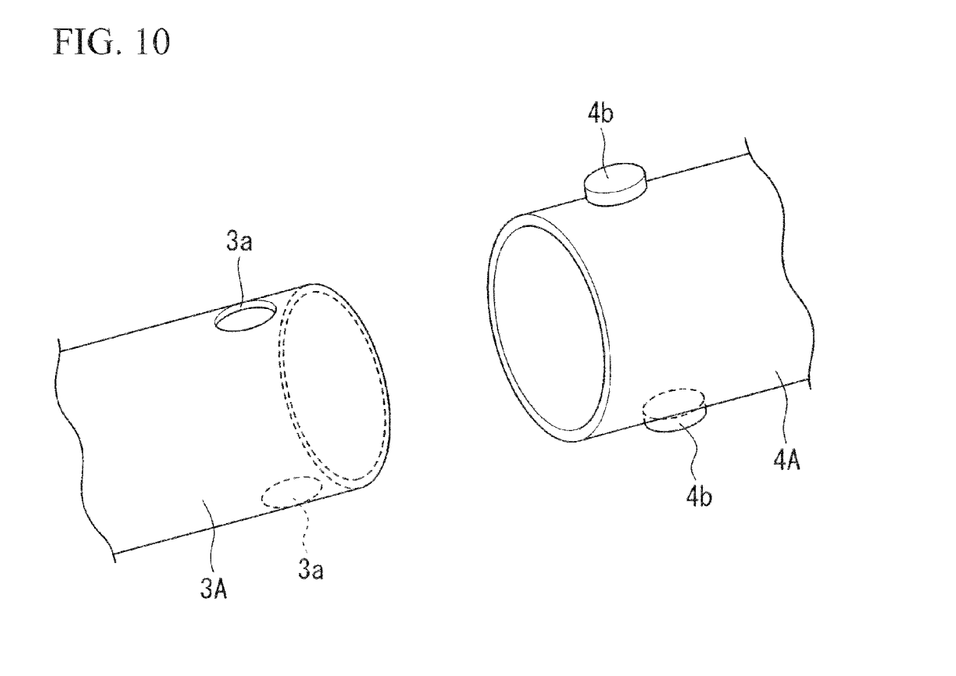
FIG. 10 is a perspective view showing a pre-join state in the junction structure for joining pipes of the first variant example of the first embodiment of the present invention.

Note that in the present embodiment, the shape of the through holes 1b in the first pipe 1 is made substantially rectangular, and the shapes of the engaging portions 2b of the second pipe 2 and the protruding portions 2e of the second pipe 2A prior to the joining are also made rectangular so as to correspond thereto. However, the present invention is not limited to this. FIG. 9 and FIG. 10 show a first variant example of this embodiment. As shown in FIG. 9, in a junction structure 11 that joins together a first pipe 3 and a second pipe 4 of this variant example, through holes 3a which are portions to be engaged of the first pipe 3 present an elliptical shape, and engaging portions 4a that protrude onto the inner circumferential surface side of the second pipe 4 are engaged therein. In this case, as shown in FIG. 10, on the pre-join second pipe 4A, it is preferable for elliptical protruding portions 4b to be formed at positions on the outer circumferential surface of the second pipe 4A that correspond to the through holes 3a in the pre-join first pipe 3A.

Figure 11:
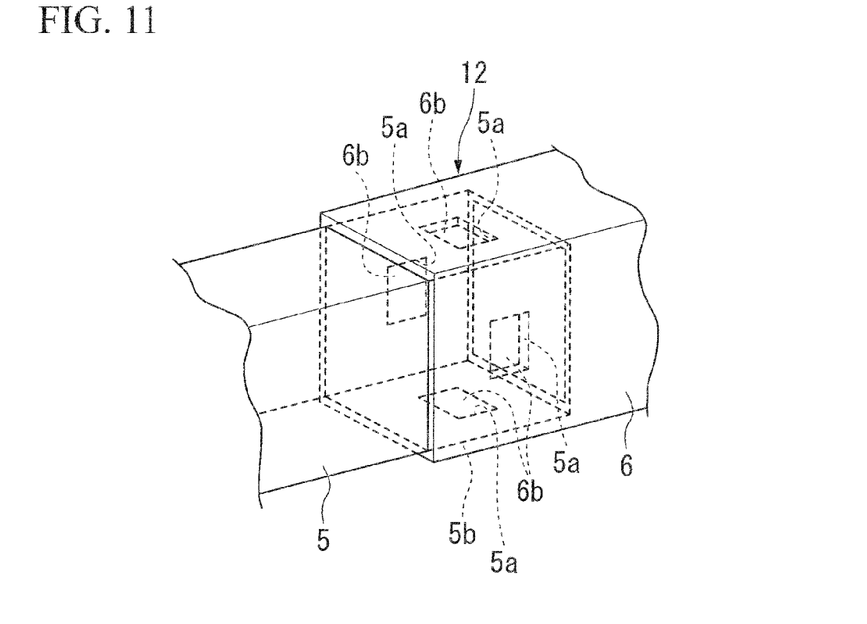
FIG. 11 is a perspective view showing a junction structure for joining pipes of a second variant example of the first embodiment of the present invention.
Figure 12:
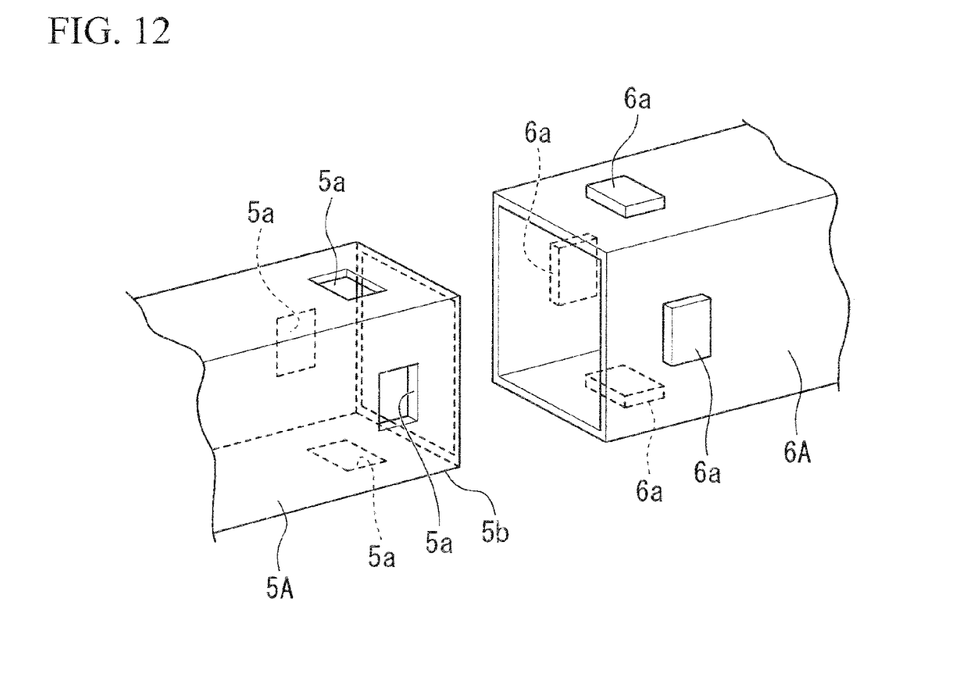
FIG. 12 is a perspective view showing a pre-join state in the junction structure for joining pipes of the second variant example of the first embodiment of the present invention.

Moreover, in the above described embodiment, a first pipe and a second pipe having a substantially circular cross-section are joined together. However, the present invention is not limited to this. It is possible to join together pipes having a variety of cross-sectional configurations. FIG. 11 and FIG. 12 show a second variant example of this embodiment. As shown in FIG. 11 and FIG. 12, in a junction structure 12 of this variant example, a first pipe 5A (5) and a second pipe 6A (6) which both have a substantially rectangular cross-section are joined together. Here, a single through hole 5a of the first pipe 5A (5) is provided in each one of the four surfaces making up the outer circumferential surface of the first pipe 5A (5) in an end portion 5b which is inserted into the second pipe 6. In addition, protruding portions 6a are provided in each of the four surfaces making up the outer circumferential surface of the pre join second pipe 6A in positions that correspond to the through holes 5a in the first pipe 5A (5). After the joining, one engaging portion 6b is provided in each one of the four surfaces making up the inner circumferential surface at positions that correspond to the protruding portions 6a, and is engaged respectively in a through hole 5a. As a result, the junction structure 12 is formed, and the two pipes can be securely joined together.

Moreover, in the above described embodiment and variant examples thereof, a plurality of groups made up of the through holes, which are the portions to be engaged, of the first pipe and the engaging portions of the second pipe are provided. However, the present invention is not limited to this. For example, only one group is also sufficient provided that it is still possible to secure the required join strength. Note that, from the standpoint of improving the join strength, it is preferable that a junction structure which is formed by as many groups of portions to be engaged and engaging portions as possible. Moreover, through holes are used to form the portions to be engaged in the first pipe. However, the present invention is not limited to this. For example, it is sufficient if they are able to form an engagement with the engaging portions that protrude on the inner circumferential surface side of the second pipe. And, any shape which is sunk from the outer circumferential surface towards the inner circumferential surface side such as a recessed portion formed in the outer circumferential surface is sufficient.

Second Embodiment

A second embodiment of the present invention is described with reference made to FIG. 13 through FIG. 18. In the present embodiment, component elements that are the same as those used in the above described first embodiment are given the same descriptive symbols and any description thereof is omitted.

Figure 13:
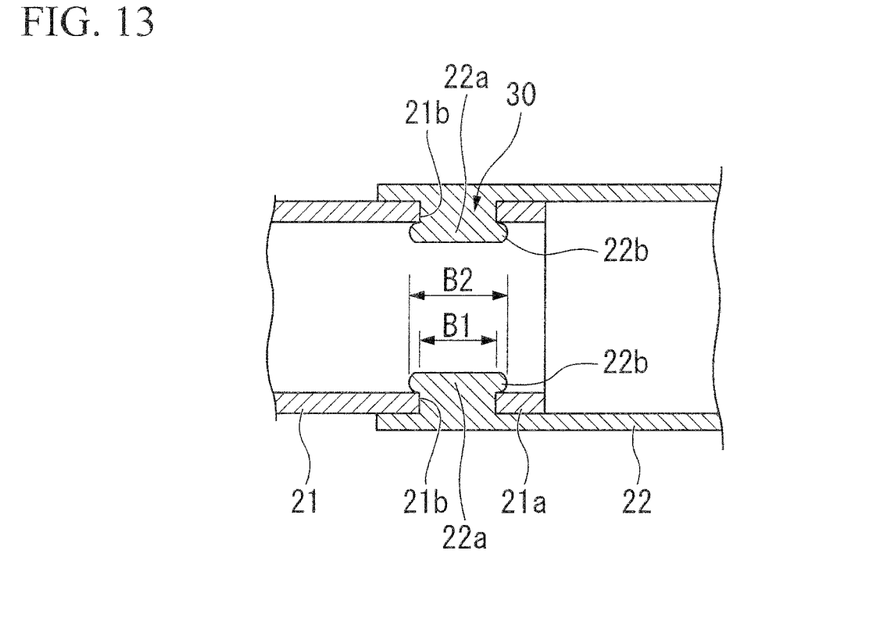
FIG. 13 is a cross-sectional view as seen from a side showing the junction structure for joining pipes of the second embodiment of the present invention.
Figure 14:
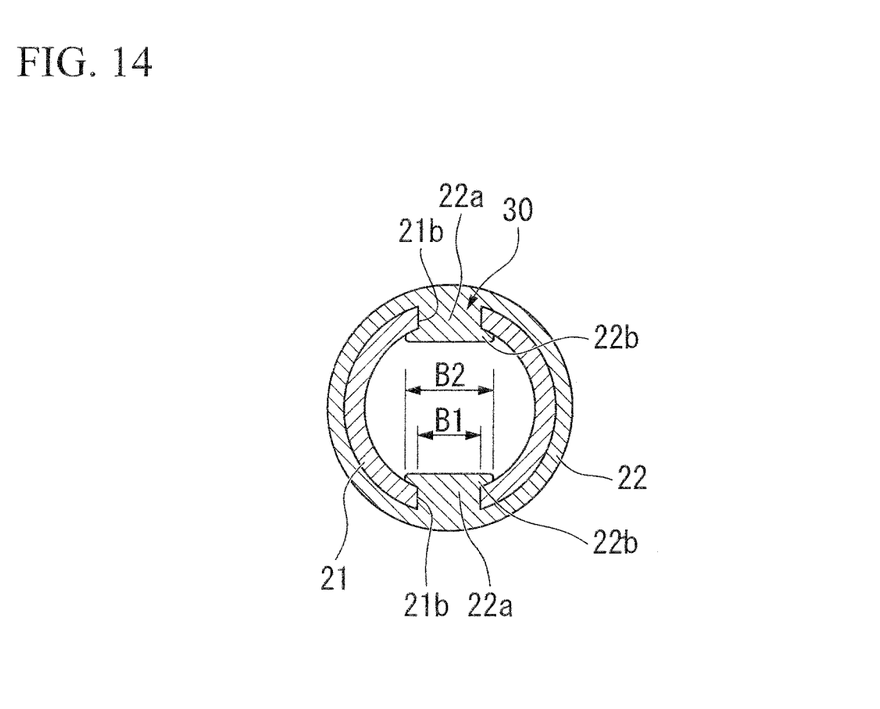
FIG. 14 is a cross-sectional view as seen from the front showing the junction structure for joining pipes of the second embodiment of the present invention.

As shown in FIG. 13 and FIG. 14, a junction structure 30 of the present embodiment joins together a first pipe 21 and a second pipe 22. This junction structure 30 has through holes 21b (portions to be engaged) that are formed in an end portion 21a of the first pipe 21 that is inserted into the second pipe 22, and engaging portions 22a that protrude from the inner circumferential surface of the second pipe 22 and are engaged in the though holes 21b. Note that, in the same way as in the first embodiment, the second pipe 22 is made of a thermoplastic resin. Distal end portions 22b of the engaging portions 22a protrude on the inner circumferential surface side beyond the through holes 21b, and are expanded to a width B2 that is larger than the width B1 of the through holes 21b. By employing these structures, the engaging portions 22a are engaged with the through holes 21b.

Figure 15:
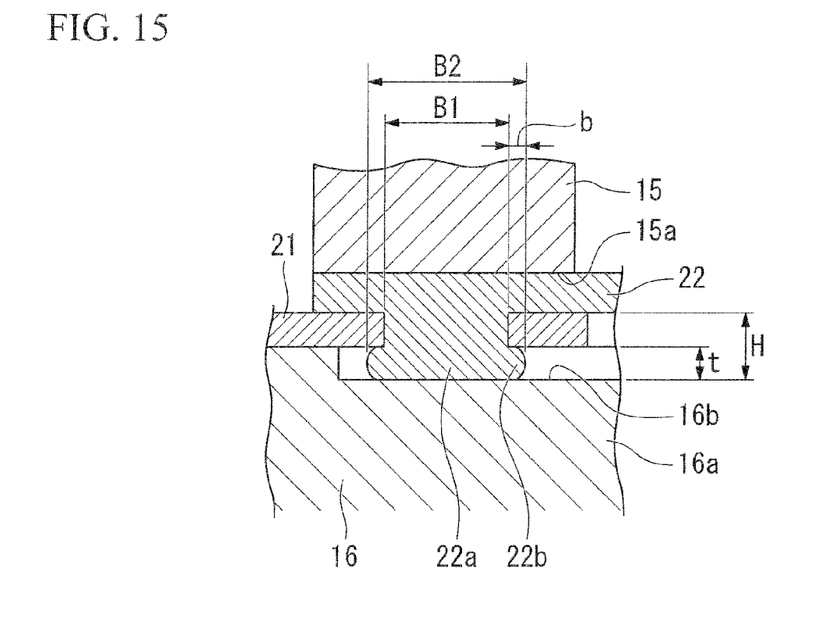
FIG. 15 is an enlarged cross-sectional view showing details of a junction portion in the junction structure for joining pipes of the second embodiment of the present invention.

Here, the respective dimensions of the through holes 21b and the engaging portions 22a can be suitably altered in accordance with the required join strength. As an example, if two pipes having a diameter of approximately 10 mm and a thickness of approximately 0.5 mm are being joined together, as shown in FIG. 15, then a protrusion amount H of the engaging portions 22a is approximately 0.75 mm, a thickness t of the distal end portions 22b is approximately 0.3 mm, and a length b of the bulge portion of the distal end portion 22b is approximately 0.3 mm.

Next, a procedure to join together the first pipe 21 and the second pipe 22 using the junction structure 30 of this embodiment is described.

Figure 16:
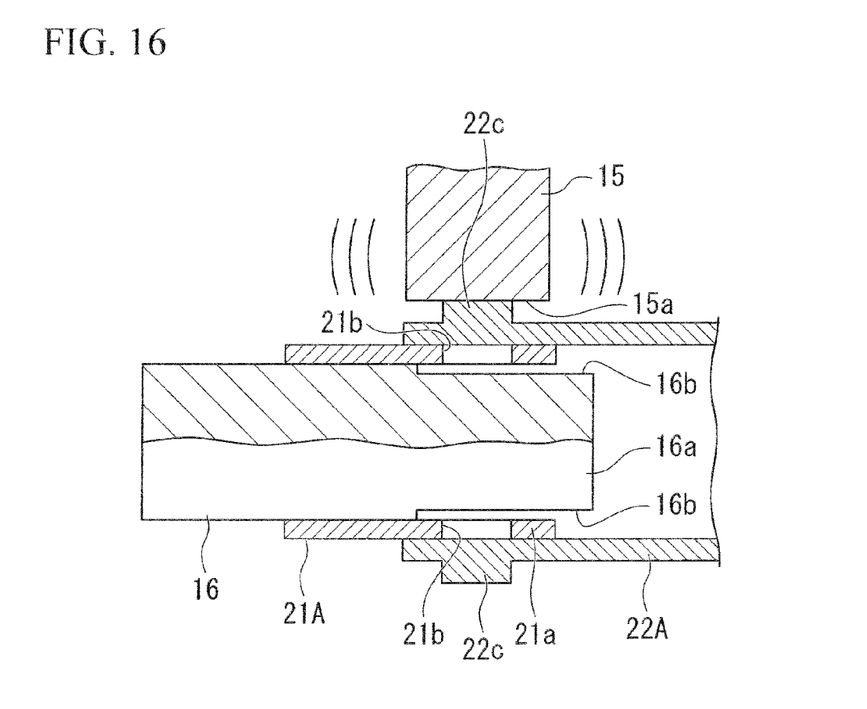
FIG. 16 is an explanatory view showing a second step of the method for joining pipes of the second embodiment of the present invention.
Figure 17:
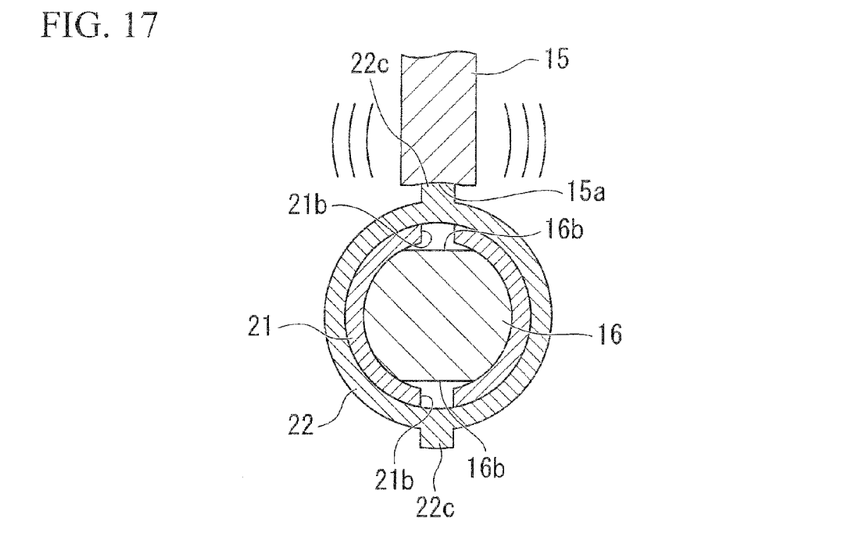
FIG. 17 is an explanatory view showing the second step of the method for joining pipes of the second embodiment of the present invention.

In a preliminary step, as shown in FIG. 16 and FIG. 17, a pre-join first pipe 21A and second pipe 22A are prepared.

In a first step, as shown in FIG. 16 and FIG. 17, the end portion 21a of the first pipe 21A is inserted into the second pipe 22A.

At this time, in the same way as in the first embodiment, there are no surface irregularities on the inner circumferential surface of the second pipe 22A prior to joining, and protruding portions 22c are formed on the outer circumferential surface thereof so as to correspond to the post-join engaging portions 22a.

In a second step, as shown in FIG. 16 and FIG. 17, the protruding portions 22c of the second pipe 22A are pressed while ultrasonic waves are transmitted thereto by the ultrasonic horn 15.

Figure 18:
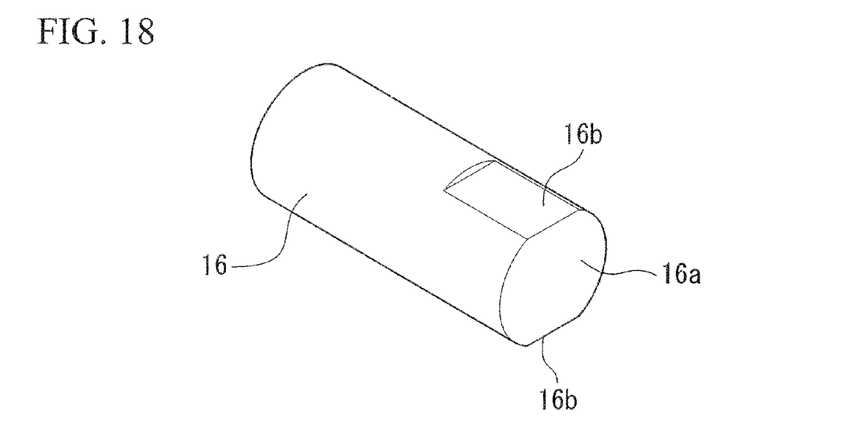
FIG. 18 is a perspective view showing an example of a molding jig that is used in the second step of the method for joining pipes of the second embodiment of the present invention.

At this time, a molding jig 16 has been inserted in advance into the interior of the first pipe 21. As shown in FIG. 16 through FIG. 18, this molding jig 16 is a substantially circular column-shaped component that corresponds to the first pipe 21, while an outer diameter thereof is substantially equal to the inner diameter of the first pipe 21. Moreover, D-cut processing has been performed in two locations which are mutually opposite each other in the radial direction on the outer circumferential surface of an end portion 16a of the molding jig 16 so as to form flat surfaces 16b. Note that this molding jig 16 is fixed inside the first pipe 21 with the axial direction and circumferential direction thereof set in predetermined positions. Specifically, the flat surfaces 16b of the molding jig 16 and the through holes 21b of the first pipe 21 are located and fixed in mutually facing positions such that the flat surfaces 16b and the through holes 21b are positioned apart from each other.

When the molding jig 16 has been fixed in the above described manner, pressing by the ultrasonic horn 15 is performed. As a result of the second pipe 22 being pressed by the ultrasonic horn 15, the protruding portions 22c which had been protruding on the outer circumferential surface side are squeezed into the outer circumferential surface, and are made to protrude as the engaging portions 22a on the inner circumferential surface side towards the inner circumferential surface side in the radial direction. Furthermore, the engaging portions 22a protrude towards the inner circumferential surface side of the first pipe 21 via the through holes 21b. At this time, the distal end portions 22b of the engaging portions 22a come into contact with the flat surfaces 16b of the molding jig 16 which is positioned apart from the inner circumferential surface of the first pipe 21. As a result, any further protruding onto the inner circumferential surface side of the first pipe 21 is prevented. Namely, the junction structure 30 is formed by the distal end portions 22b of the engaging portions 22a being deformed in a sideways direction on the flat surfaces 16b, and by the width B2 being hereby expanded so as to become wider than the width B1 of the through holes 21b.

The junction structure 30 which is constructed in the above described manner is able to resist pulling which is applied in a radial direction not simply by means of friction force between the through holes 1b and the engaging portions 22a, but also by means of the engagement of the distal ends 22b. Namely, the first pipe 21 and the second pipe 22 can be more securely joined together.

Figure 19:
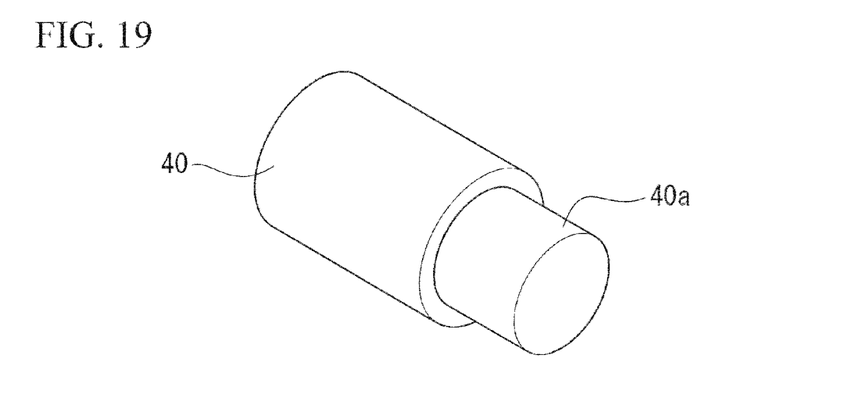
FIG. 19 is a perspective view showing another example of a molding jig that is used in the second step of the method for joining pipes of the second embodiment of the present invention.
Figure 20:
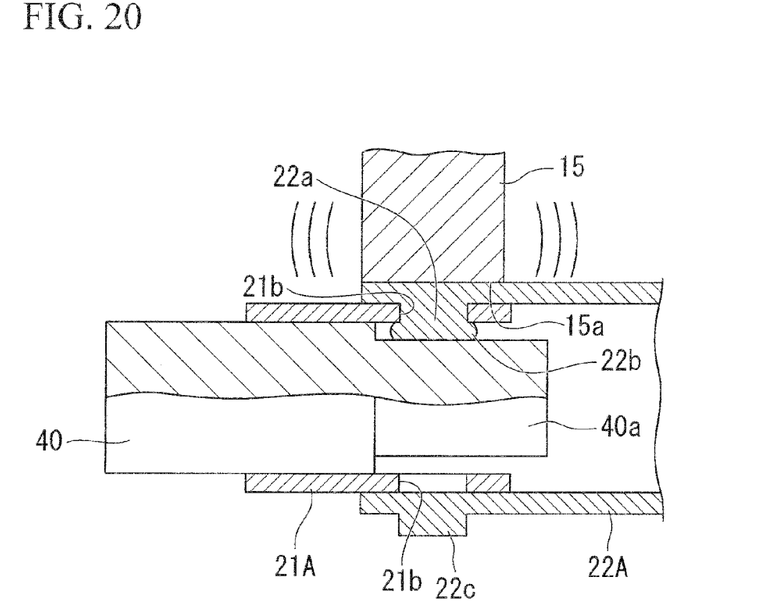
FIG. 20 is an explanatory view showing the second step when the molding jig of the other example is used in the method for joining pipes of the second embodiment of the present invention.
Figure 21:
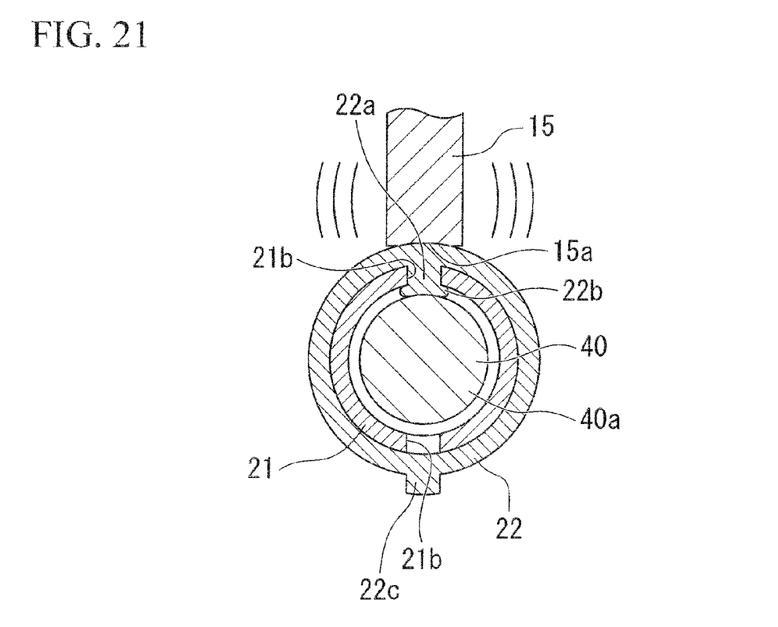
FIG. 21 is an explanatory view showing the second step when the molding jig of the other example is used in the method for joining pipes of the second embodiment of the present invention.

Note that in the joining method of the above described embodiment, the molding jig that is used is not limited to the one described above. For example, it is sufficient if it is able to be inserted inside the first pipe 21 and be fixed within a range that contains the through holes 21b while being positioned apart from the inner circumferential surface of the first pipe 21. FIG. 19 through FIG. 21 show a variant example of the present embodiment. As shown in FIG. 19, a molding jig 40 that is used in this variant example is a substantially circular column-shaped component having an outer diameter that is substantially equal to the inner diameter of the first pipe 21A, and has a distal end portion 40a of which the outer diameter is decreased. In a second step, this molding jig 40 is inserted into the first pipe 21A such that the distal end portion 40a faces the through holes 21b. When the pressing by the ultrasonic horn 15 is performed, the distal end portion 22b of the engaging portion 22a being formed is deformed on the outer circumferential surface of the distal end portion 40a, and expands. Namely, in the same way as in the present embodiment, the engaging portions 22a are engaged in the through holes 21b. In the case of this variant example, because the deformation of the engaging portion 22a occurs at the outer circumferential surface of the substantially circular column-shaped distal end portion 40a, the overall thickness in the radial direction of the expanded distal end portion 40a can be made substantially equal. Because of this, the engagement by the distal end portion 22b of the engaging portion 22a can be made more secure and stronger.

Embodiments of the present invention have been described in detail with reference made to the drawings. However, the specific structure thereof is not limited to these embodiments. Various design modifications and the like may be made insofar as they do not depart from the scope of the present invention.

According to the method for joining pipes of the present invention, it is sufficient for a second pipe to be made to protrude into a portion to be engaged of a first pipe by being heated and softened by ultrasonic waves. Because of this, two pipes can be joined together cheaply and easily. Furthermore, by causing an engaging portion to be engaged in the portion to be engaged, the necessary strength can be secured, and a reliable join state can be achieved. Moreover, according to the junction structure for joining pipes of the present invention, as a result of the engaging portion of a second pipe being engaged in the portion to be engaged of a first pipe, the necessary strength can be secured and the two pipes can be joined firmly together. Furthermore, as a result of the second pipe being made of a thermoplastic resin, the engaging portion can be formed and engaged easily, and a joined state can be reliably and cheaply achieved.

What is claimed is:

1. A method for joining pipes in which a first pipe and a second pipe that is made of thermoplastic resin are joined together, comprising:
    a first step in which an end portion of the first pipe, which includes at least one portion to be engaged that is sunk toward an inner circumferential surface side at an outer circumferential surface of the end portion of the first pipe, is inserted into an end portion of the second pipe, in which at least one protruding portion is formed on an outer circumferential surface of the end portion of the second pipe, and the portion to be engaged is positioned at an inner circumferential surface side of the protruding portion of the second pipe; and
    a second step in which, as a result of a transmitting component that transmits ultrasonic waves being pressed against an outer circumferential surface of the protruding portion that is positioned corresponding to the portion to be engaged of the first pipe which is inserted into the second pipe, the second pipe is softened by the ultrasonic waves so that an engaging portion which is made to protrude from an inner circumferential surface of the second pipe into the portion to be engaged is formed, and becomes engaged with the portion to be engaged.

2. The method for joining pipes according to claim 1, wherein
    the portion to be engaged of the first pipe is a through hole that penetrates from the outer circumferential surface to the inner circumferential surface of the first pipe, and,
    in the second step, after a molding jig has been positioned inside the first pipe within a range where at least the through hole is formed and while being positioned apart from the inner circumferential surface of the first pipe, the transmitting component is pressed against the second pipe so that a portion of the second pipe is made to protrude onto the inner circumferential surface side of the first pipe as the engaging portion until the second pipe is deformed by the molding jig.

* * * * *